Sept. 25, 1928.

W. J. McVICKER ET AL 1,685,171

SEPARABLE TRACTOR DUMP WAGON

Filed May 3, 1920

Inventors:
Walter J. McVicker
Arthur R. Sandt
by: [signature]
Attorney.

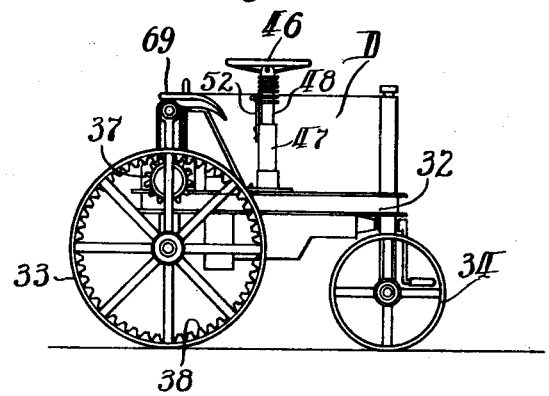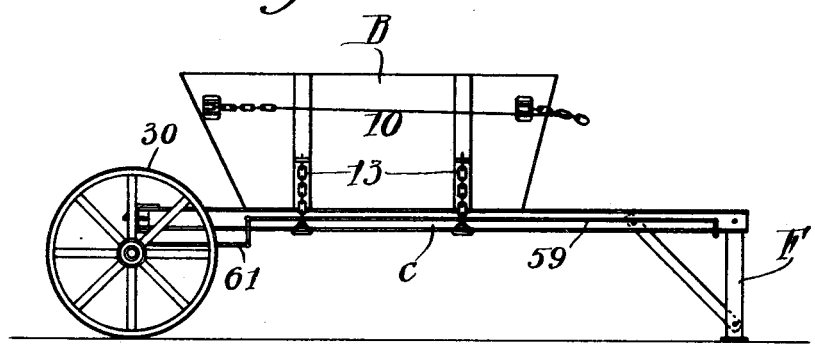

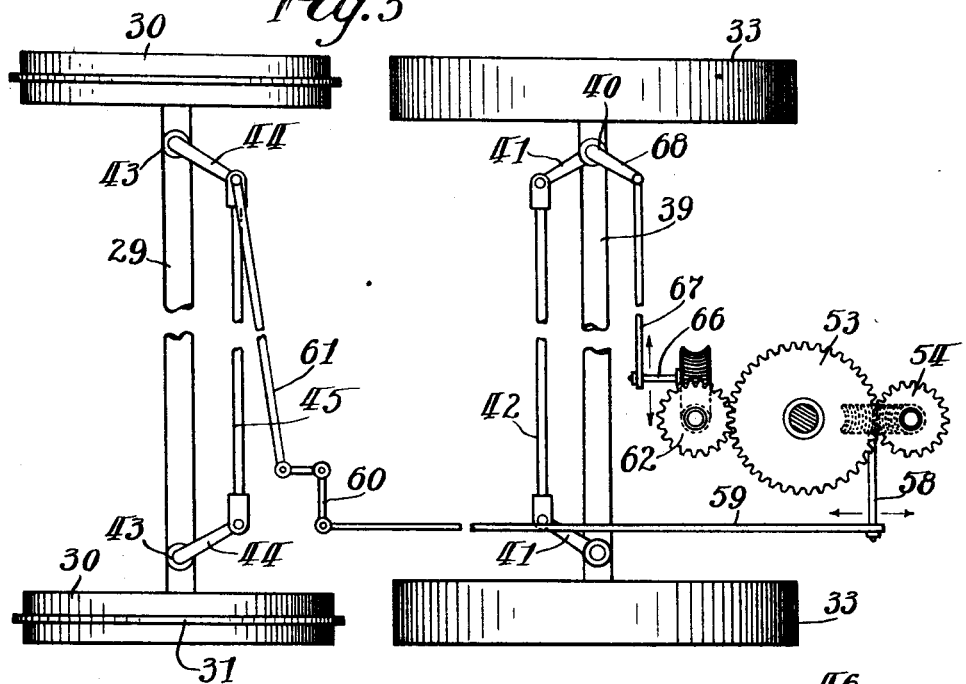
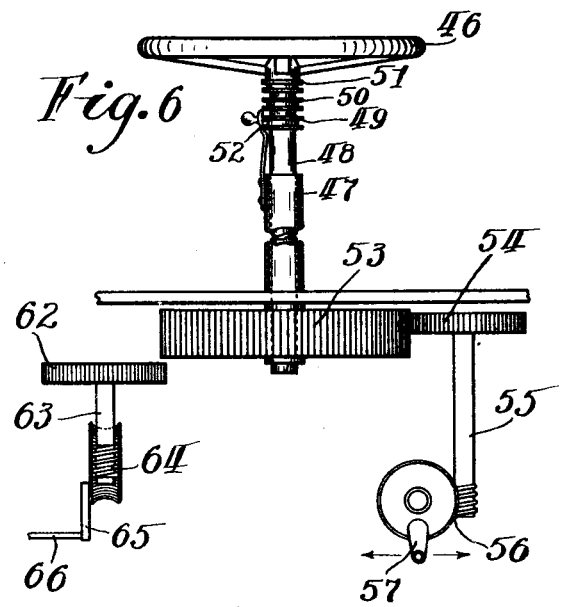

Sept. 25, 1928.

W. J. McVICKER ET AL 1,685,171

SEPARABLE TRACTOR DUMP WAGON

Filed May 3, 1920

Inventors:
Walter J. McVicker
Arthur R. Sandt
by: Attorney.

Patented Sept. 25, 1928.

1,685,171

UNITED STATES PATENT OFFICE.

WALTER J. McVICKER AND ARTHUR R. SANDT, OF MINNEAPOLIS, MINNESOTA, ASSIGNORS TO ENTERPRISE MACHINERY COMPANY, OF MINNEAPOLIS, MINNESOTA.

SEPARABLE TRACTOR DUMP WAGON.

Application filed May 3, 1920. Serial No. 378,423.

Our invention relates to a separable tractor dump wagon the tractor element of which operates readily in connection with other road machinery such as graders and scrapers and said dump body being designed light in weight throughout the body portion, while the tractor element is capable of propelling the dump wagon in either direction.

A feature of our invention is in means for steering the wagon in either direction with either pair of wheels at a time or all of the wheels at the same time, which allows it to be readily steered and makes it easier to handle in close quarters, especially where it is necessary to make short turns. This steering means assists in the operation in connection with the reversible autopropelling features and thus allows the wagon to be operated equally well in either direction.

A further object of our invention is in the detachable tractor or motive element which can be quickly disengaged from the dump wagon proper and converted into a tractor to be used for various purposes, particularly in connection with road work for hauling scrapers, graders or assisting other dump wagons at a time when a heavy pull is desired. This feature of the invention provides means whereby the motive element of our device is interchangeable with any one of a series of dump wagon portions so that where a breakdown of a wagon occurs another dump wagon can be connected with a motive element of our device or vice versa. These features are particularly essential for a device of this kind in connection with road grading and work of this nature.

The invention also provides means for operating the dumping doors of the wagon by the engine of the tractor. In this way the doors can be more quickly and easily closed after the wagon has been dumped and without the operator having to wind up the closing means by hand power.

In the drawings forming part of this specification:

Figure 3 is a side elevation of the motive element or tractor detached from the body of the dump wagon and with front wheels added.

Figure 4 is a side elevation of the detached dump wagon as it may be supported when the tractor or motive element is detached therefrom.

Figure 5 is a plan view, illustrating the steering mechanism, a portion of which is broken away and partly illustrated in cross section.

Figure 6 is a side elevation of a portion of the steering mechanism, part of which is broken away.

Figure 1:
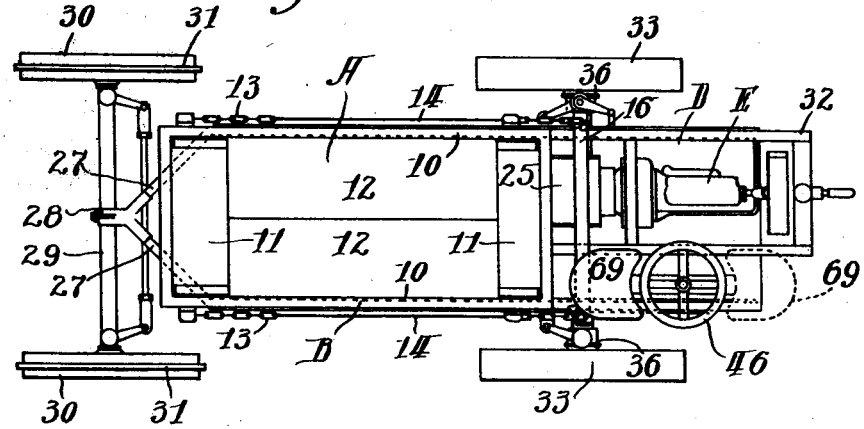
Figure 1 is a plan view of our separable tractor dump wagon.

The drawings illustrate the dump wagon tractor A with a dumping body B having vertical side walls 10 and slanting end walls 11, while under-slung dumping doors 12 are connected by suitable chains 13 in an ordinary, well-known manner to allow the doors 12 to be released and clear the sides 10 of the dumping body B when it is desired to dump the load contained therein.

The doors 12 are closed in the ordinary, well-known manner by the chains 13 and rods 14 positioned on either side of the side walls 10, the ends of the chains 13 being secured to the winding drums 15 positioned on the ends of the transversely extending shaft 16. This mechanism is of ordinary construction on dump wagons of this type and is illustrated in the drawings. A ratchet wheel 17, which is adapted to be engaged by the pawl 18 of the releasing ratchet lever 19, holds the shaft 16 in a set position. This also is of ordinary construction. A suitable operating lever 20, having ordinary engaging means, not illustrated in the drawing, for operating the ratchet wheel 17, can be operated by hand if desired to rotate the shaft 16 to wind up the ends of the chains 13 on the drums 15 to manually close the doors 12 if it is desired. This hand operated closing means is not ordinarily used but the shaft 16 is connected by the chain 21 to the shaft 22, which carries the clutch 23 to connect the shaft 16 with a drive shaft 24 extending from the transmission 25 of a motor element, which will be hereinafter described. The clutch 23 is operated by a hand lever 26 so that during the operation of the motor element of the dump wagon, by engaging the hand lever 26 and holding the clutch 23 in closed or operating position the chain 21 will drive and rotate the shaft 16 to close the doors 12 by the power of the motor element.

The dump body B is supported by the longitudinally extending angle iron frame C, which extends beyond the ends of the body and is supported by inwardly diverging arms 27, which come together into a bracket 28 to pivotally support one end of the dump body to the axle 29, which carries supporting wheels 30. The bracket 28 is positioned centrally between the wheels 30 on the axle 29 and allows free lateral movement of the body B to compensate the unevenness in the road and thus more easily balance the tractor dump wagon. The pair of wheels 30 are provided with annular steering ribs 31 of ordinary construction.

A tractor element D, having an internal combustion engine or motive element E which is secured to the angle iron frame 32, is detachably connected in any suitable manner to the end of the frame C opposite the wheels 30. The frame 32 is supported by a pair of drive wheels 33 on one end of the same. When the tractor element D is connected to the frame C the drive wheels 33 form supports for one end of the dump body frame C. It is obvious that the body of the frame C and the tractor frame element 32 can be connected in any suitable manner so as to be readily separable from each other when desired. The supporting wheels 33 support the frame 32 so as to be collectively removable and form a part of the tractor element, which is readily separable from the body of the frame so as to be attached easily to another similar body frame if it is desired. When the tractor element D is separated from the dump body frame suitable supporting wheels 34 can be attached in an ordinary manner to the frame 32 and thus the tractor element D forms a tractor which is adapted for various uses.

When the tractor element D is separated from the frame C, the end of the frame C which is detached from the frame 32 can be held in elevated position above the ground by a suitable supporting bracket F, which may be of ordinary construction and pivoted to the end of the frame C so that it can be readily folded under the frame when not desired for use. This support allows the tractor element D to be more easily attached to the frame C.

The motor E of the tractor element D is connected to the transmission 25, which is of ordinary construction and which is connected to a drive shaft 35 with the drive wheels 33 through the universal joints 36 positioned near either end of the shaft 35 and the driving pinions 37, which engage the bull gear 38 secured in an ordinary manner to the drive wheels 33. When the motor E is operated and the transmission 25 is connected, the drive wheels 33 can be operated to propel the dump wagon in either direction.

The pair of wheels 33 are pivotally attached to the axle 39 of the tractor element D at 40 and are connected by the steering knuckle arms 41 to the rod 42, while the other pair of wheels 30 are pivotally connected to the axle 29 at 43 and are connected by the steering knuckle arms 44 to the tie rod 45. A steering wheel 46 is supported by the standard 47 to the frame 32 of the tractor element D and the steering post 48 of the same is adapted to be moved up and down into various positions, while collars 49, 50 and 51, which are rigidly attached to the steering post 48, are engaged in the various positions of the steering wheel 46 by the spring catch 52, which holds the steering wheel to be operated in the different positions. The spring catch 52 can be disengaged from any of the collars 49, 50 or 51 so as to set the wheel 46 in the desired position. An operating main gear 53 is secured to the lower end of the steering post 48 and engages with the gear 54, which is attached to a shaft 55 and is connected by the gearing 56 to operate the steering lever 57. The steering lever is connected by a suitable arm 58 to the rod 59, which extends longitudinally of the frame C and connects with a suitable bell crank arm 60, which in turn is connected to the rod 61. The rod 59 has a separable connection therein, not shown, so that half thereof is carried by the tractor and half by the wagon. The bell crank arm 60 is secured in a suitable manner to the frame C, while the arm 61 is connected to the tie rod 45 so as to operate the pair of wheels 30 when the gear 53 of the steering wheel 46 is in the position illustrated in Figure 6, engaging the gear 54 and the spring catch is engaged in the collar 49. In this position the steering wheel 46 is adapted to operate the pair of wheels 30 to steer the dump wagon in the desired direction. When the spring catch 52 is disengaged from the collar 49 and is brought into engagement with the collar 50, the gear 53 is moved into engagement with a gear 62, which is similar to the gear 54 and which connects through the shaft 63 with a gearing 64, while the gearing 64 carries a steering lever 65 which in turn is connected by the arm 66 to the rod 67 and the rod 67 connects with a steering knuckle arm 68 to operate the steering wheels 33. In this position with the catch engaging the collar 50, the steering wheel 46 will operate the pair of wheels 30 and 33 in unison to steer the tractor in the desired direction, thus using all the supporting wheels for steering the self-propelled dumping wagon. When the spring catch 52 is disengaged from the collar 50 or brought into engagement with the collar 51 by pressing the steering post 48 downward the gear 53 is disengaged from the gear 54 and is left into engagement with the gear 62 so that the wheels 33 can be operated independent of the wheels 30 to steer the self-propelled dump wagon. By this means of steering, the dump wagon can be steered with short turns and is more easily handled in its operation, a feature which is of primary importance in our invention.

It is obvious that the driving wheels 33 can be provided with suitable cleats or road engaging means, not illustrated in the drawings, to assist in their gripping the ground.

Figure 2:
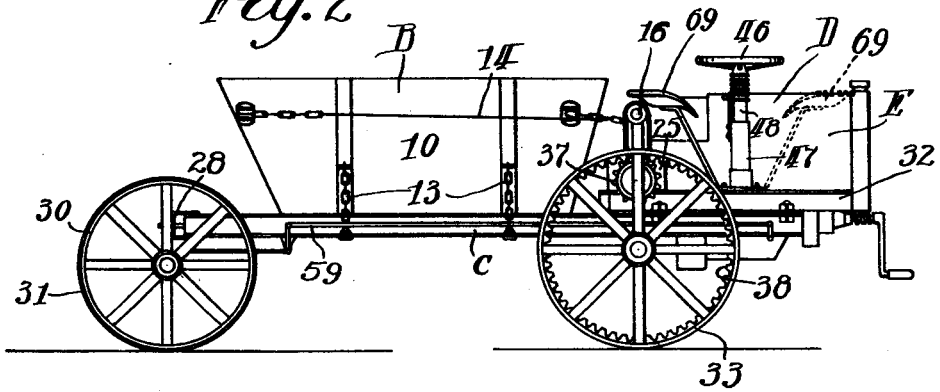
Figure 2 is a side elevation of the same.
Figure 7:
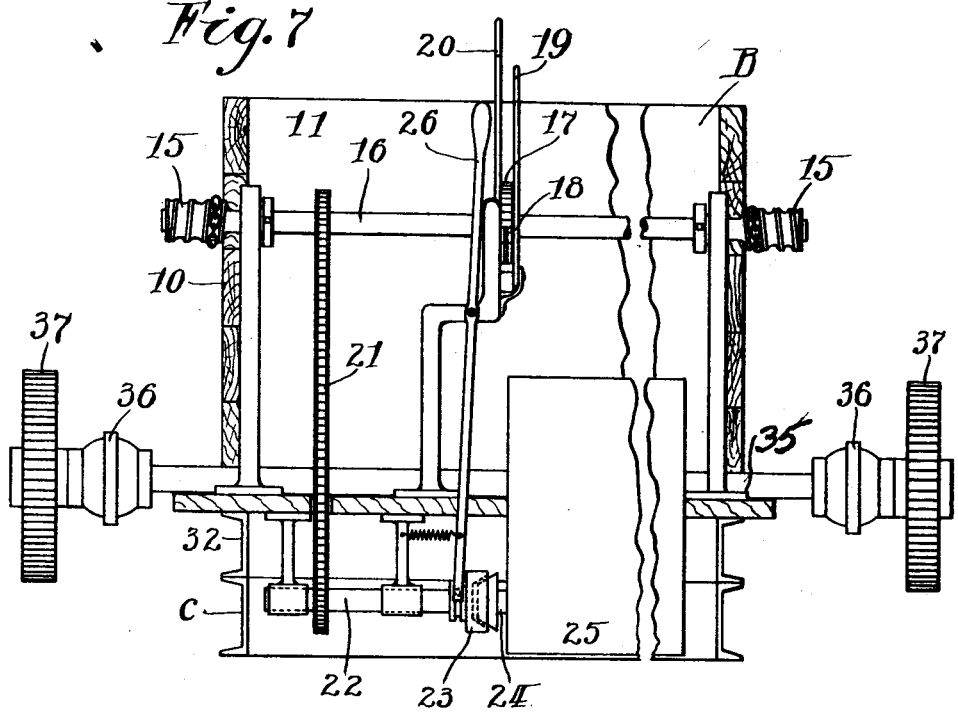
Figure 7 is an end view of a portion of the dump wagon, illustrating the operating lever and power connection for the door closing means.
Figure 8:
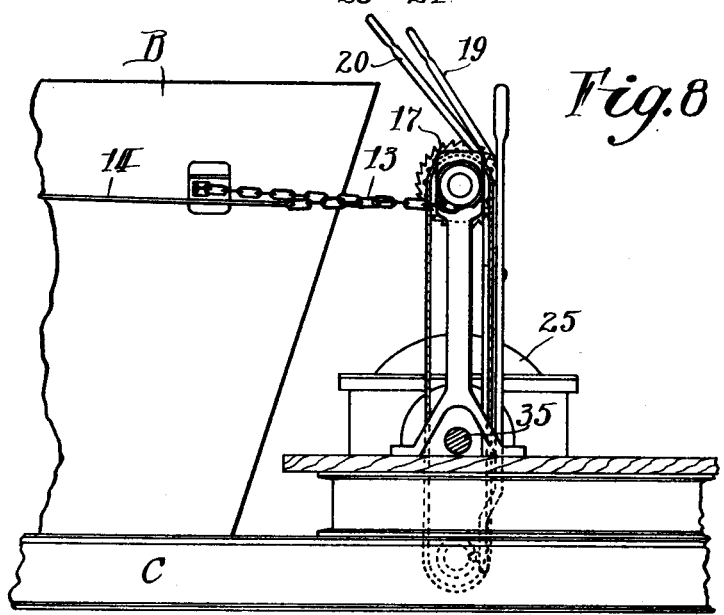
Figure 8 is a side elevation of the mechanism illustrated in Figure 7, a portion of which is broken away.

A suitable seat 69 for the operator is provided on the frame 32 in convenient relation to the steering wheel 46, the supporting bracket of which is pivotally attached to the steering standard 47 so that the seat can be turned either in the position illustrated in full lines or the position illustrated in dotted lines in Figure 2. As it is very desirable in our separable tractor dump wagon to drive the same in either direction it is important to have the seat movable to accommodate these conditions and by the arrangement illustrated the operator can comfortably and easily operate the dump wagon.

In the use of our device in connection with road work it is very important to operate the same in either direction, especially when working in connection with a road grader and scraper, which elevates into the dump wagon A as it travels along. When the dump wagon A is filled it can travel in either direction away from the grader without necessitating turning around then and can thus quickly move away from the grader to allow another dump wagon to come along side of the same while the filled tractor wagon proceeds to a place where it can empty its load. In any use of a dump wagon of this nature it is desirable to be able to drive it in either direction or to steer it with one pair of wheels independent of the other pair or if it is found necessary to use all of the supporting wheels to steer the same it is desirable to be able to do so. All of these features are readily accomplished by our device.

In accordance with the patent statutes we have described the principles of operation of our invention, together with the apparatus which we now consider to represent the best embodiment thereof, but we desire to have it understood that the construction shown is only illustrative and that the invention can be carried out by other means and applied to uses other than those above set forth within the scope of the following claims.

We claim:

1. A separable tractor wagon, including a body, a detachable tractor element secured to one end of said wagon, means for steering said wagon in either direction and means for steering said wagon with the pair of wheels at either end thereof, with each pair independent of each other or with all of the wheels collectively.

2. A detachable tractor wagon comprising a body, a frame supporting said body, a pair of steering wheels pivoted to said body frame at the rearward end thereof, a tractor frame detachably mounted on said body frame, a pair of driving wheels mounted on said tractor frame at the rearward end thereof adjacent the forward end of said body frame, a steering mechanism connected with said tractor driving wheels for steering the same and a steering mechanism connected with said rearward body wheels for steering the same, and an engine and driving mechanism mounted on said tractor frame in advance of said driving wheels.

3. A wagon, having a detachable tractor element, a body, a body frame, wheels adapted to support said frame laterally being pivoted thereto at one end, drive wheels adapted to support said tractor element, means for detachably connecting said tractor element and drive wheels to one end of said dumping body and steering means adapted to steer said wagon in either direction.

4. A wagon, having a body, a detachable tractor element attached to one end of said body, drive wheels adapted to support said tractor element, wheels adapted to support the other end of said dump body, a steering wheel and standard secured to said tractor element adapted in one position to steer said dump wagon with said drive wheels, in another position to steer with all of the supporting wheels and in another position to steer with the wheels positioned at the opposite end of said body to said drive wheels, said tractor element being adapted to propel said dump wagon in either direction and said steering means being adapted to steer said wagon in short turns easily.

5. A detachable tractor wagon comprising a wagon frame, a body positioned rearwardly on said wagon frame, supporting wheels at the rearward end of said wagon frame, said wagon frame being open at its forward end, a tractor element having driving wheels, an axle housing therefore positioned at a height below said wagon frame, a tractor frame secured to said tractor and positioned above said wagon frame, the lower portion thereof being free from said axle to permit said wagon frame to be slided along the same and attached thereto.

6. A separable tractor wagon comprising a wagon element, wheels for supporting the same, a tractor element, wheels for supporting the same, a steering gear mounted on said tractor element for steering said tractor wheels, a steering element mounted on said wagon element for steering said wagon wheels, means for detachably connecting said steering elements together and means for selectively operating either of said steering mechanisms.

7. A vehicle comprising rear and front wheels, an independent steering gear connected to each of said pairs of steering wheels, a vertical shaft for driving each of said steering gears, spur gears attached to each of said shafts, a vertically positioned steering post, a spur gear connected therewith and adapted to mesh with either or both of said first named spur gears and means for shifting said spur gear to permit the vehicle to be steered by either or both of said pairs of wheels.

8. A tractor wagon comprising a wagon element, independent steering mechanisms for both said tractor and wagon elements, a steering post mounted near the center of said tractor element for steering by either said tractor element or wagon element and a reversible seat adapted to be moved in proximity to said steering post so that the tractor wagon may be steered independently or in conjunction with the wagon element.

WALTER J. McVICKER.
ARTHUR R. SANDT.